United States Patent
Babcock

(10) Patent No.: US 7,070,538 B2
(45) Date of Patent: Jul. 4, 2006

(54) CLUTCH CONTROL FOR AUTOMATED MANUAL TRANSMISSION (AMT)

(75) Inventor: Douglas J. Babcock, Dexter, MI (US)

(73) Assignee: General Motors Corporation, Detroit, MI (US)

( * ) Notice: Subject to any disclaimer, the term of this patent is extended or adjusted under 35 U.S.C. 154(b) by 57 days.

(21) Appl. No.: 10/772,849

(22) Filed: Feb. 5, 2004

(65) Prior Publication Data

US 2005/0176556 A1    Aug. 11, 2005

(51) Int. Cl.
*B60W 10/02* (2006.01)
*B60W 10/04* (2006.01)

(52) U.S. Cl. .............. 477/179; 477/174; 477/181; 477/102

(58) Field of Classification Search ......... 477/179, 477/181, 174, 101, 102
See application file for complete search history.

(56) References Cited

U.S. PATENT DOCUMENTS

| | | | |
|---|---|---|---|
| 4,509,625 A * | 4/1985 | Tellert | 477/86 |
| 4,924,832 A * | 5/1990 | Abe | 477/102 |
| 6,258,008 B1 * | 7/2001 | Tabata et al. | 477/107 |
| 6,594,572 B1 * | 7/2003 | Amendt et al. | 701/48 |
| 6,770,009 B1 * | 8/2004 | Badillo et al. | 477/102 |
| 2004/0128050 A1 * | 7/2004 | Rieger et al. | 701/67 |
| 2004/0138027 A1 * | 7/2004 | Rustige et al. | 477/175 |
| 2004/0214687 A1 * | 10/2004 | Morisawa et al. | 477/109 |

* cited by examiner

*Primary Examiner*—Tisha Lewis
(74) *Attorney, Agent, or Firm*—Christopher DeVries

(57) ABSTRACT

A vehicle having an engine and an automated manual transmission (AMT) includes an electronically controlled clutch (ECC) that selectively couples the engine and the AMT to transfer drive torque to the AMT. A controller communicates with the ECC and the engine and generates a load signal based on an anticipated engine load. The controller adjusts spark timing of the engine based on the load signal prior to engagement of the ECC. The controller adjusts spark timing of the engine based on a rate of change of engine speed after engagement of the ECC.

12 Claims, 3 Drawing Sheets

CLUTCH CONTROL FOR AUTOMATED MANUAL TRANSMISSION (AMT)

FIELD OF THE INVENTION

The present invention relates to clutch control, and more particularly to clutch control for an automated manual transmission (AMT).

BACKGROUND OF THE INVENTION

Many vehicles entering the market today include automated manual transmissions (AMT's). Shift operation of an AMT is similar to that of a manual transmission. The AMT, however, includes an electronically controlled clutch and shift forks. A traditional manual transmission includes a clutch pedal and manually actuated shift forks. The electronically controlled clutch selectively couples the AMT and the engine based on signals from a controller.

AMT's simplify vehicle operation, increase driving comfort and aid in reducing fuel consumption and exhaust emission. Vehicles implementing traditional AMT's, however, experience undesired driveline oscillation. More specifically, as the electronically controlled clutch engages, the frequency of the applied engine torque contains the natural frequency of the driveline. As a result, the driveline oscillates, generating a ring.

Control techniques have been developed to counter the driveline oscillation, however, these techniques fall short. Conventional techniques are reactionary rather than proactively prohibiting driveline oscillation. For example, RPM derivative spark control (RDSC) adjusts spark timing based on the rate of change of engine speed to reduce the amplitude and duration of the driveline oscillation. However, during clutch engagement, RDSC feature reacts to the change in engine RPM. Therefore, driveline oscillation occurs first and RDSC inhibiting second.

SUMMARY OF THE INVENTION

Accordingly, the present invention provides a vehicle having an engine and an automated manual transmission (AMT). The vehicle includes an electronically controlled clutch (ECC) that selectively couples the engine and the AMT to transfer drive torque from the engine to the AMT. A controller communicates with the ECC and the engine and generates a load signal based on an anticipated engine load. The controller adjusts spark timing of the engine based on the load signal prior to engagement of the ECC. The controller adjusts spark timing of the engine based on a rate of change of engine speed after engagement of the ECC.

In one feature, the vehicle further includes a clutch engagement sensor that generates an engagement signal based upon a degree of engagement of the ECC. The controller generates the load signal when the engagement signal is received. The clutch engagement sensor generates the engagement signal immediately prior to full engagement of the ECC.

In another feature, the vehicle further includes an engine speed sensor that generates an engine speed signal and a manifold absolute pressure (MAP) sensor that generates a pressure signal. The load signal is based on the engine speed signal and the pressure signal. The vehicle further includes a gear ratio sensor that generates a gear signal indicating a current operating gear of the AMT. The load signal is further based on said gear signal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
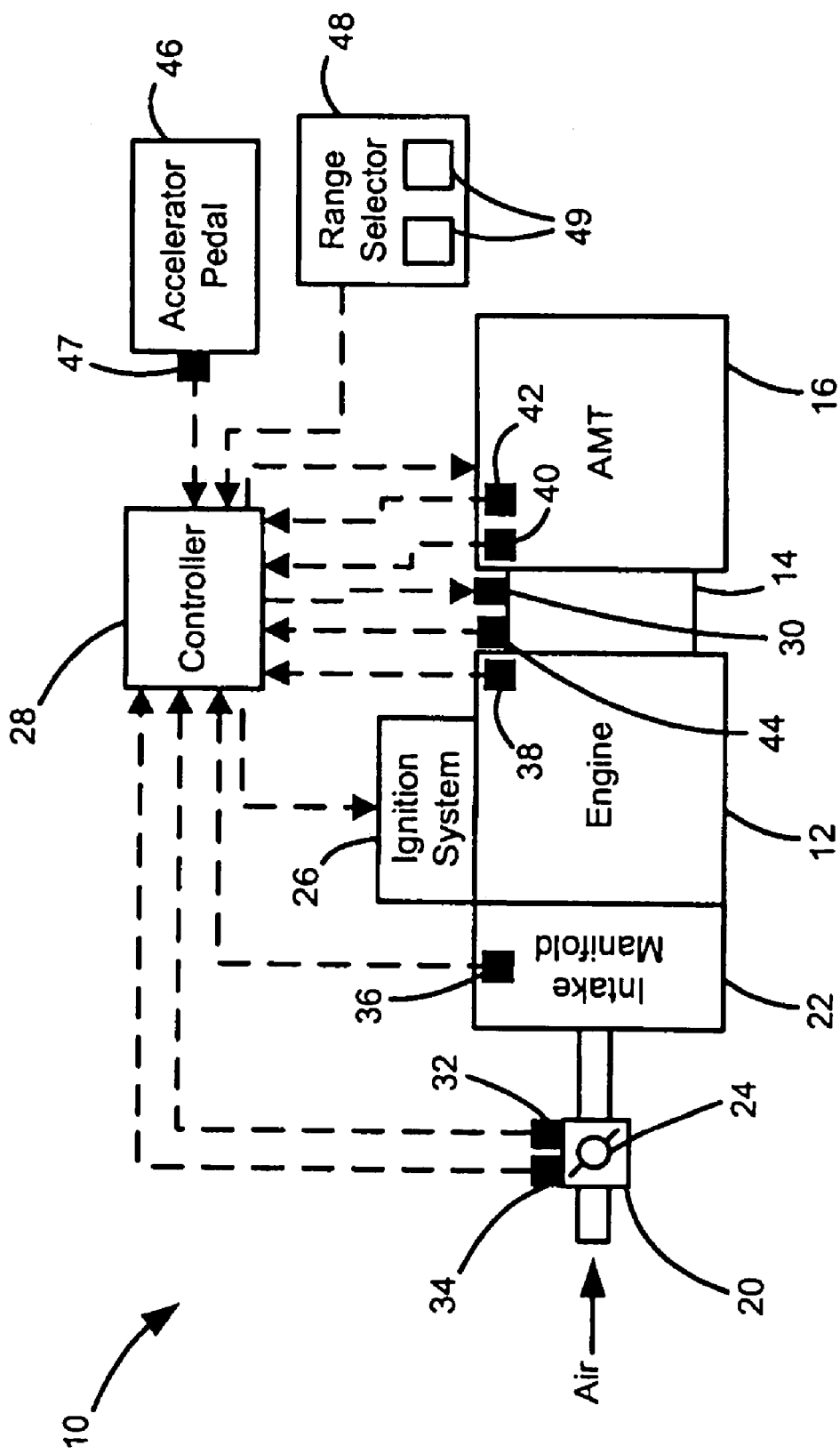
FIG. 1 is a schematic illustration of a vehicle including an automated manual transmission (AMT) control system according to the present invention.

The following description of the preferred embodiments is merely exemplary in nature and is in no way intended to limit the invention, its application, or uses. For purposes of clarity, the same reference numbers will be used in the drawings to identify similar elements.

Referring now to FIG. 1, a vehicle 10 is schematically illustrated. The vehicle 10 includes and engine 12, a clutch 14 and a transmission 16. The clutch 14 selectively couples the engine 12 and transmission 16 to transfer drive torque from the engine 12 to the transmission 16 to drive the vehicle 10. The transmission 16 is an automated manual transmissions (AMT) and the clutch 14 is a hydraulically controlled wet or dry clutch.

The engine 12 includes a throttle 20 and an intake manifold 22. Air is drawn into the intake manifold 22 through the throttle 20. The throttle 20 includes a throttle plate 24 that is adjustable to regulate the air flow into the intake manifold 22. The air drawn into the intake manifold 22 is mixed with fuel for combustion within cylinders (not shown) of the engine 12. Combustion of the air fuel mixture is initialized by spark plugs that are controlled by an ignition system 26. Spark plug timing can be adjusted by the ignition system 26 relative to the stroke position of pistons (not shown) slidably disposed within the cylinders. Spark advance or retard relative to piston stroke position varies the torque output of the engine 12.

A controller 28 controls operation of the engine 12, clutch 14 and transmission 16 based on an AMT control according to the present invention. The controller 28 communicates with the ignition system 26 to control spark timing and an actuator 30 to control clutch engagement. The actuator 30 can be a mechanical actuator or a hydraulic actuator that regulates clutch engagement by varying hydraulic pressure. The controller 28 also communicates with a throttle position sensor (TPS) 32 and a throttle actuator 34. The TPS 32 generates a throttle position signal and the throttle actuator 34 adjusts the position of the throttle plate 24 based on a control signal generated by the controller 28.

Figure 2:
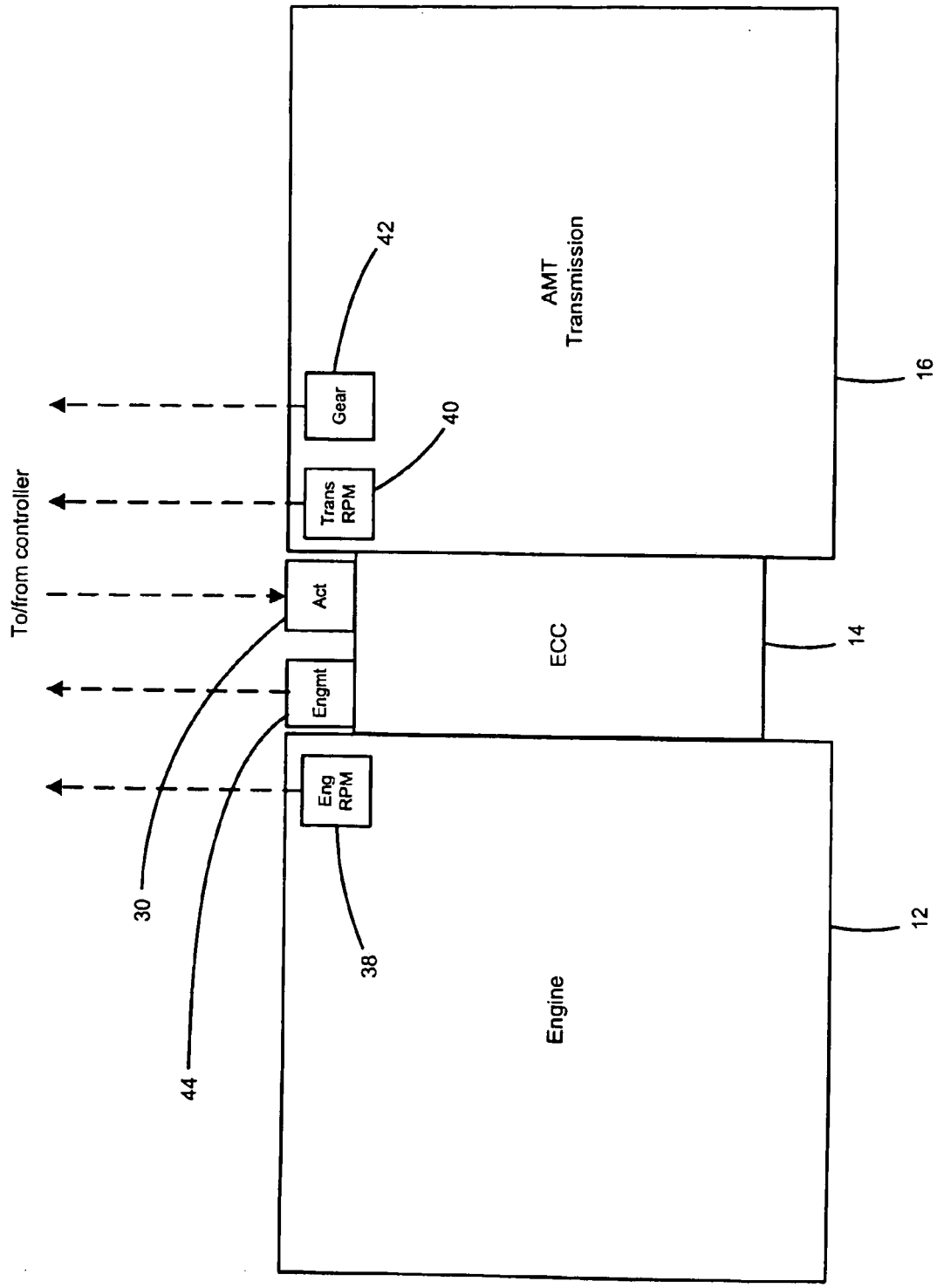
FIG. 2 is a more detailed view of a portion of the vehicle of FIG. 1 illustrating sensors associated with an engine, clutch and the AMT.

The controller 28 also communicates with an intake manifold absolute pressure (MAP) sensor 36, an engine speed sensor 38, a transmission speed sensor 40, a gear sensor 42 and a clutch engagement sensor 44. The MAP sensor 36 generates a pressure signal and the engine speed sensor 38 generates a speed signal indicating the engine RPM's. The transmission speed sensor 40 generates a signal indicating the rotational speed of a transmission output shaft (not shown) and the gear sensor 42 generates a signal indicating the current gear the transmission is operating in. The clutch engagement sensor 44 detects the position of a clutch plate relative to an engine flywheel and generates a signal at the moment clutch plate and flywheel contact is imminent. The sensors are detailed in FIG. 2.

The vehicle 10 further includes an accelerator pedal 46 (i.e, throttle input) and a range selector 48 (i.e., shift input). An accelerator pedal position (APP) sensor 47 generates an APP signal that is communicated to the controller 28. The controller 28 controls actuation of the throttle plate 24 based on the APP signal. The range selector 48 is a multi-state switch and includes tap-up/tap-down shift inputs 49. The range selector 48 electrically communicates with the transmission 16 to indicate an operating mode of the transmission 16. The operating modes can include, but are not limited to, reverse, neutral, drive and tap shift. In the drive mode, the controller 28 determines gear shifting based on a shift schedule. In the tap shift mode, a vehicle operator can command a gear shift (up or down). In either mode, a shift signal is generated indicating that a gear shift is desired.

The controller 28 controls the engine 12, the clutch 14 and the transmission 16 based on the AMT control. Although the controller 28 is described as a single controller that controls and monitors the powertrain of the vehicle 10, it is anticipated that the controller 28 can include separate control modules such as an engine control module (ECM) and transmission control module (TCM) that communicate via a serial bus. The controller samples engine speed, transmission input shaft speed, transmission gear, APP, MAP and clutch position and determines whether a spark knock limit is active. Spark knock limit is the maximum amount of spark adjustment allowed before engine knock occurs.

To initiate a vehicle launch, the driver depresses the accelerator pedal 46 while the vehicle is at rest. Upon indication of vehicle launch the controller 28 initiates clutch engagement. Upon the receiving the imminent clutch engagement signal generated by the clutch engagement sensor 44, the controller 28 determines an anticipated engine load. The anticipated engine load is based on clutch capacity (i.e., clutch torque transfer capability), APP (i.e, driver torque demand), gear ratio, vehicle speed, engine speed and MAP. Immediately prior to clutch engagement, the controller 28 adjusts the spark timing of the engine based on the anticipated engine load. The controller 28 determines and schedules the spark timing based on the anticipated engine load taking into account spark knock limit.

By adjusting the spark timing immediately prior to clutch engagement, initial engine RPM droop is minimized and a faster clutch engagement is enabled. Additionally, the excitation of the natural frequency of the driveline is prevented, thereby inhibiting driveline oscillation and ringing. After the clutch 14 is engaged, the controller 28 adjusts spark timing based on RPM derivative spark control (RDSC). RDSC adjusts spark timing based on the rate of change of engine RPM. The direction and magnitude of engine RPM determines the spark timing adjustment. RDSC also inhibits driveline oscillation by preventing excitation of the natural frequency of the driveline. In this manner, spark timing is used throughout vehicle launch and afterward to reduce/increase engine torque to prevent droop or flare.

Figure 3:
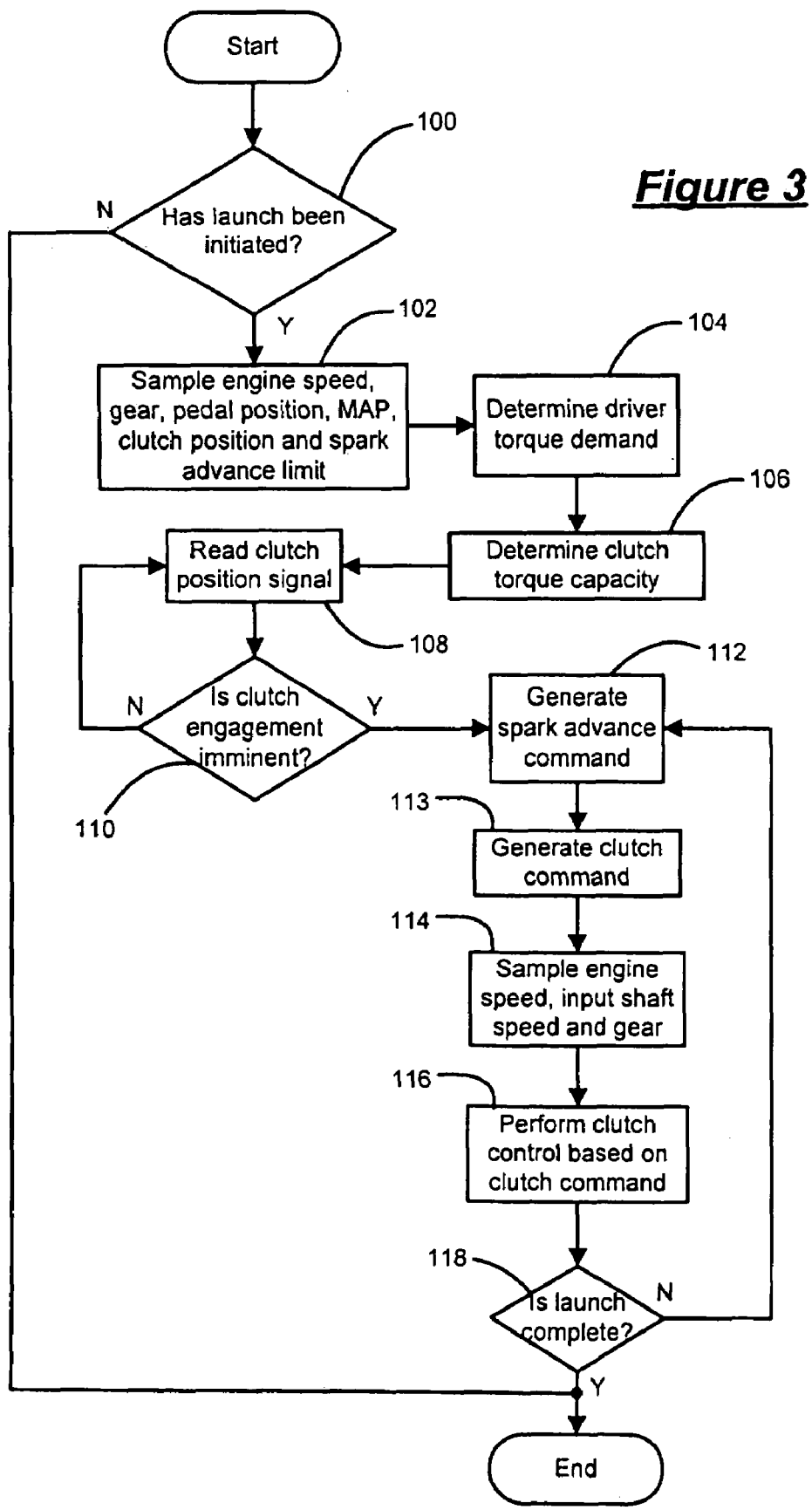
FIG. 3 is a flowchart illustrating the AMT control according to the present invention.

Referring now to FIG. 3, the steps of the AMT control are illustrated. In step 100, control determines whether vehicle launch has been initiated. If not, control ends. Otherwise, control samples engine speed, gear, APP, MAP and clutch position in step 102. In step 104, control determines driver torque demand based on the APP signal. In step 106, control determines clutch torque capacity. The clutch engagement sensor generates the clutch position signal in step 108.

In step 110, control determines whether clutch engagement is imminent. If clutch engagement is not imminent, control continues in step 108. If clutch engagement is imminent, control continues in step 112. In step 112, control generates a spark advance command based on the driver torque demand and clutch torque capacity. In step 113, control generates the clutch control command. In step 114, control samples engine speed, transmission input shaft speed and gear. In step 116 control performs clutch control based on spark advance command and clutch control command. Control determines whether vehicle launch is complete in step 118. If vehicle launch is complete, control ends. If vehicle launch is not complete, control continues in step 114 to again perform clutch control based on the sampled engine speed, input shaft speed and gear.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A vehicle having an engine and an automated manual transmission (AMT), comprising:
    an electronically controlled clutch (ECC) that selectively couples said engine and said AMT to transfer drive torque to said AMT; and
    a controller that communicates with said ECC and said engine and that generates a load signal based on an anticipated driver torque demand, that adjusts one of spark timing of said engine and an ECC pressure based on said load signal prior to engagement of said ECC to minimize an anticipated engine RPM droop and that adjusts spark timing of said engine based on a rate of change of engine speed after engagement of said ECC, wherein engagement of said ECC is determined based on an engagement signal.

2. The vehicle of claim 1 further comprising a clutch engagement sensor that generates said engagement signal based upon a degree of engagement of said ECC, wherein said controller generates said load signal when the engagement signal is received.

3. The vehicle of claim 1 wherein said clutch engagement sensor generates said engagement signal immediately prior to full engagement of said clutch.

4. The vehicle of claim 1 further comprising:
    an engine speed sensor that generates an engine speed signal; and
    a manifold absolute pressure (MAP) sensor that generates a pressure signal, wherein said load signal is based on said engine speed signal and said pressure signal.

5. The vehicle of claim 4 further comprising a gear ratio sensor that generates a gear signal indicating a current operating gear of said AMT, wherein said load signal is further based on said gear signal.

6. A method of operating an automated manual transmission (AMT) having an electronically controlled clutch (ECC) that is selectively engaged to couple said AMT and said engine, comprising:

generating a load signal based on an anticipated driver torque demand;

adjusting one of spark timing of said engine and an ECC pressure based on said load signal prior to engagement of said ECC to minimize an anticipated engine RPM droop; and adjusting spark timing of said engine based on a rate of change of engine speed after engagement of said ECC, wherein engagement of said ECC is determined based on an engagement signal.

7. The method of claim 6 further comprising:
generating a shift signal;
disengaging said ECC based on said shift signal;
shifting gears of said AMT; and
initiating engagement of said ECC.

8. The method of claim 6 further comprising:
initiating engagement of said ECC; and
detecting a degree of engagement of said ECC, wherein said load signal is generated when detecting near full engagement of said ECC.

9. The method of claim 6 further comprising:
generating an engine speed signal; and
generating a manifold absolute pressure (MAP) signal, wherein said load signal is based on said engine speed signal and said MAP signal.

10. A method of shifting gears of an automated manual transmission (AMT) having an electronically controlled clutch (ECC), comprising:
initiating engagement of said ECC;
detecting imminent engagement of said ECC;
generating a load signal based on an anticipated driver torque demand upon detecting imminent engagement of said ECC;
adjusting spark timing of said engine based on said load signal prior to said imminent engagement of said ECC; and
adjusting spark timing of said engine based on a rate of change of engine speed after engagement of said ECC.

11. The method of claim 10 further comprising:
generating a shift signal;
disengaging said ECC based on said shift signal; and
shifting gears of said AMT.

12. The method of claim 10 further comprising:
generating an engine speed signal; and
generating a manifold absolute pressure (MAP) signal, wherein said load signal is based on said engine speed signal and said MAP signal.

* * * * *